(12) United States Patent
Tokunaga et al.

(10) Patent No.: US 9,706,077 B2
(45) Date of Patent: Jul. 11, 2017

(54) ELECTRONIC APPARATUS, LINK SYSTEM OF ELECTRONIC APPARATUSES, AND METHOD OF LINKING ELECTRONIC APPARATUSES

(71) Applicant: KYOCERA DOCUMENT SOLUTIONS INC., Osaka (JP)

(72) Inventors: Tomoharu Tokunaga, Osaka (JP); Tsuyoshi Murakawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/213,202

(22) Filed: Jul. 18, 2016

(65) Prior Publication Data

US 2017/0034390 A1 Feb. 2, 2017

(30) Foreign Application Priority Data

Jul. 31, 2015 (JP) .................................. 2015-151463
Jul. 31, 2015 (JP) .................................. 2015-151466
Jul. 31, 2015 (JP) .................................. 2015-151467

(51) Int. Cl.
*H04N 1/32* (2006.01)
*H04N 1/00* (2006.01)

(52) U.S. Cl.
CPC ..... *H04N 1/32523* (2013.01); *H04N 1/00347* (2013.01); *H04N 2201/0013* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS 6,970,431 B1 * 11/2005 Iijima ............... H04L 12/40078
370/242
2003/0063601 A1 * 4/2003 Niida .................. H04L 12/2803
370/360

FOREIGN PATENT DOCUMENTS

JP        1993-207043 A    8/1993
WO       WO 00/79736 A1   12/2000

* cited by examiner

*Primary Examiner* — Andrew H Lam
(74) *Attorney, Agent, or Firm* — Li & Cai Intellectual Property (USA) Office

(57) ABSTRACT

An electronic apparatus includes: a connection circuit connectable to a network; a command acquisition circuit that acquires a family generation command for generating one family including all electronic apparatuses connected to the network; a detection circuit that detects a plurality of electronic apparatuses connected to the network; and a correspondence relation generation circuit that generates, when the command acquisition circuit receives the family generation command, a correspondence relation with each of the two electronic apparatuses that have not generated a correspondence relation with other electronic apparatuses, out of the plurality of detected electronic apparatuses.

14 Claims, 14 Drawing Sheets

# ELECTRONIC APPARATUS, LINK SYSTEM OF ELECTRONIC APPARATUSES, AND METHOD OF LINKING ELECTRONIC APPARATUSES

INCORPORATION BY REFERENCE

This application claims the benefit of Japanese Priority Patent Applications JP 2015-151463, JP 2015-151467, and JP 2015-151466 filed Jul. 31, 2015, the entire contents of which are incorporated herein by reference.

BACKGROUND

The present disclosure relates to an electronic apparatus connectable to a network, a link system of the electronic apparatuses connected to the network, and a method of linking the electronic apparatuses connected to the network.

In a typical network, with a specific terminal being a master terminal and a plurality of other terminals being general terminals, a plurality of image reading terminals and a plurality of image output terminals are connected in a loop.

In other typical networks, a plurality of child nodes are connected to one parent node like a tree.

SUMMARY

The present disclosure provides a link system of electronic apparatuses that includes a plurality of electronic apparatuses connected to a network and that does not require a master apparatus (server), a method of linking electronic apparatuses, and an electronic apparatus capable of structuring the link system.

According to an embodiment of the present disclosure, there is provided an electronic apparatus, including:

a connection circuit connectable to a network;

a command acquisition circuit that acquires a family generation command for generating one family including all electronic apparatuses connected to the network;

a detection circuit that detects a plurality of electronic apparatuses connected to the network; and a correspondence relation generation circuit that generates, when the command acquisition circuit receives the family generation command, a correspondence relation with each of the two electronic apparatuses that have not generated a correspondence relation with other electronic apparatuses, out of the plurality of detected electronic apparatuses.

According to an embodiment of the present disclosure, there is provided a link system of electronic apparatuses, including three or more electronic apparatuses connected to a network, each of the electronic apparatuses including
  a connection circuit connectable to the network,
  a command acquisition circuit that acquires a family generation command for generating one family including all electronic apparatuses connected to the network,
  a detection circuit that detects a plurality of electronic apparatuses connected to the network, and
  a correspondence relation generation circuit that generates, when the command acquisition circuit receives the family generation command, a correspondence relation with each of the two electronic apparatuses that have not generated a correspondence relation with other electronic apparatuses, out of the plurality of detected electronic apparatuses, the three or more electronic apparatuses being connected annularly by each generating a correspondence relation with each of the two electronic apparatuses.

According to an embodiment of the present disclosure, there is provided a method of linking three or more electronic apparatuses connected to a network, including, by each of the electronic apparatuses:

acquiring a family generation command for generating one family including all electronic apparatuses connected to the network;

detecting a plurality of electronic apparatuses connected to the network; and generating, upon receiving the family generation command, a correspondence relation with each of the two electronic apparatuses that have not generated a correspondence relation with other electronic apparatuses, out of the plurality of detected electronic apparatuses, the three or more electronic apparatuses being connected annularly by each generating a correspondence relation with each of the two electronic apparatuses.

These and other objects, features and advantages of the present disclosure will become more apparent in light of the following detailed description of best mode embodiments thereof, as illustrated in the accompanying drawings.

DETAILED DESCRIPTION

Hereinafter, an embodiment of the present disclosure in a case where an electronic apparatus according to the embodiment of the present disclosure is an image forming apparatus will be described with reference to the drawings.

1. GENERAL OUTLINE OF LINK SYSTEM OF IMAGE FORMING APPARATUSES

Figure 1:
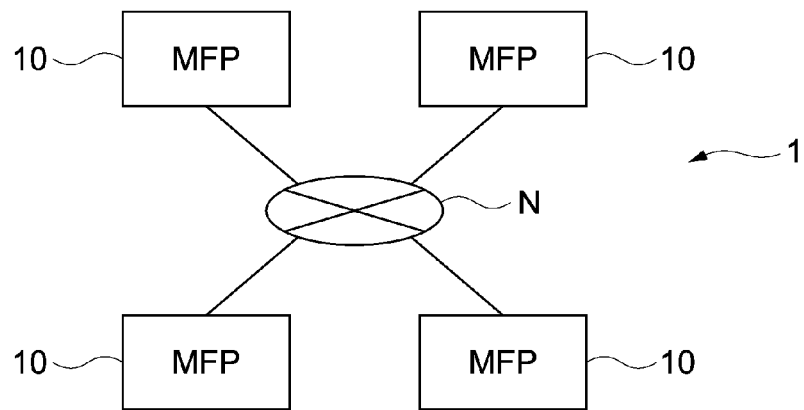
FIG. 1 shows a link system of image forming apparatuses according to an embodiment of the present disclosure.

FIG. 1 shows a link system of image forming apparatuses according to the embodiment of the present disclosure.

The link system 1 of image forming apparatuses includes three or more image forming apparatuses 10 connected to a network N. The image forming apparatus 10 is typically an MFP (Multifunction Peripheral) and will be referred to as "MFP 10" hereinafter. The MFPs 10 are capable of communicating with one another via the network N. Typically, the network N is an office LAN (Local Area Network), and the MFPs 10 are provided inside one office.

Each of the MFPs 10 generates one-on-one correspondence relations (parent-child relations) with two of the three or more MFPs 10 connected to the network N. All of the MFPs 10 connected to the network N generate parent-child relations with two other MFPs 10 as described above. Consequently, all the MFPs 10 are connected annularly (in beads) on even ground (no server and the like). As a result, all the MFPs 10 constitute one family. The relation of the family will be described in more detail.

It should be noted that the "parent-child" used in this embodiment does not mean master-slave or superior-subordinate and is used merely for convenience of descriptions. In short, the two MFPs 10 having the "parent-child" relation stand on a completely equal footing.

Figure 2:
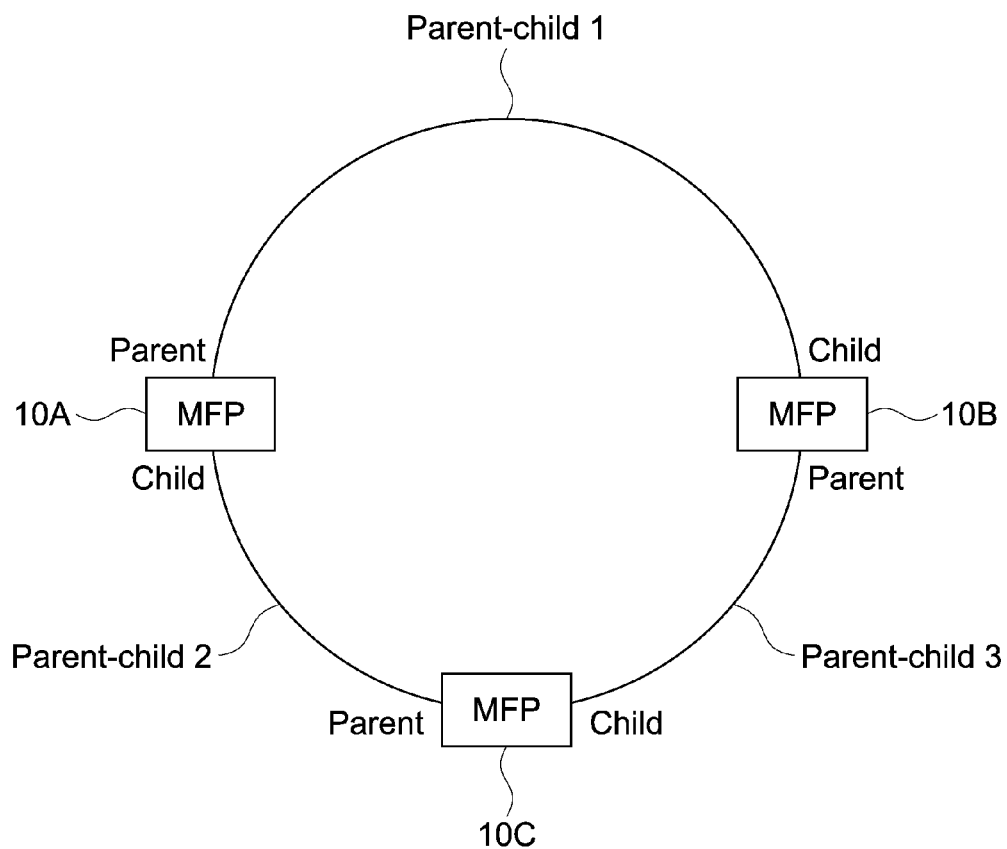
FIG. 2 shows a structure of a family including a plurality of MFPs (Multifunction Peripherals)

FIG. 2 shows a structure of a family including the plurality of MFPs.

For simplification, three MFPs 10 (MFP 10A, MFP 10B, and MFP 10C) are illustrated.

The MFP 10A (parent) and the MFP 10B (child) generate a parent-child relation (parent-child 1). More specifically, the MFP 10A stores identification information (e.g., IP address, same holds true in descriptions below) of the MFP 10B as the child. The MFP 10B stores identification information of the MFP 10A as the parent.

The MFP 10A (child) and the MFP 10C (parent) generate a parent-child relation (parent-child 2). More specifically, the MFP 10A stores identification information of the MFP 10C as the parent. The MFP 10C stores identification information of the MFP 10A as the child.

The MFP 10B (parent) and the MFP 10C (child) generate a parent-child relation (parent-child 3). More specifically, the MFP 10B stores identification information of the MFP 10C as the child. The MFP 10C stores identification information of the MFP 10B as the parent.

All the MFPs 10A to 10C connected to the network N generate one-on-one relations (parent-child relations) with the two other MFPs 10A to 10C excluding itself as described above. Accordingly, all the MFPs 10A to 10C are connected annularly on an equal footing (no server and the like) so as to generate one family. Even if there are 4 or more MFPs 10 (as will be described later with reference to FIG. 8), all the MFPs 10 can be connected annularly on an equal footing by all the MFPs 10 generating one-on-one relations (parent-child relations) with two other MFPs 10, so as to generate one family.

2. HARDWARE STRUCTURE OF MFP

Figure 3:
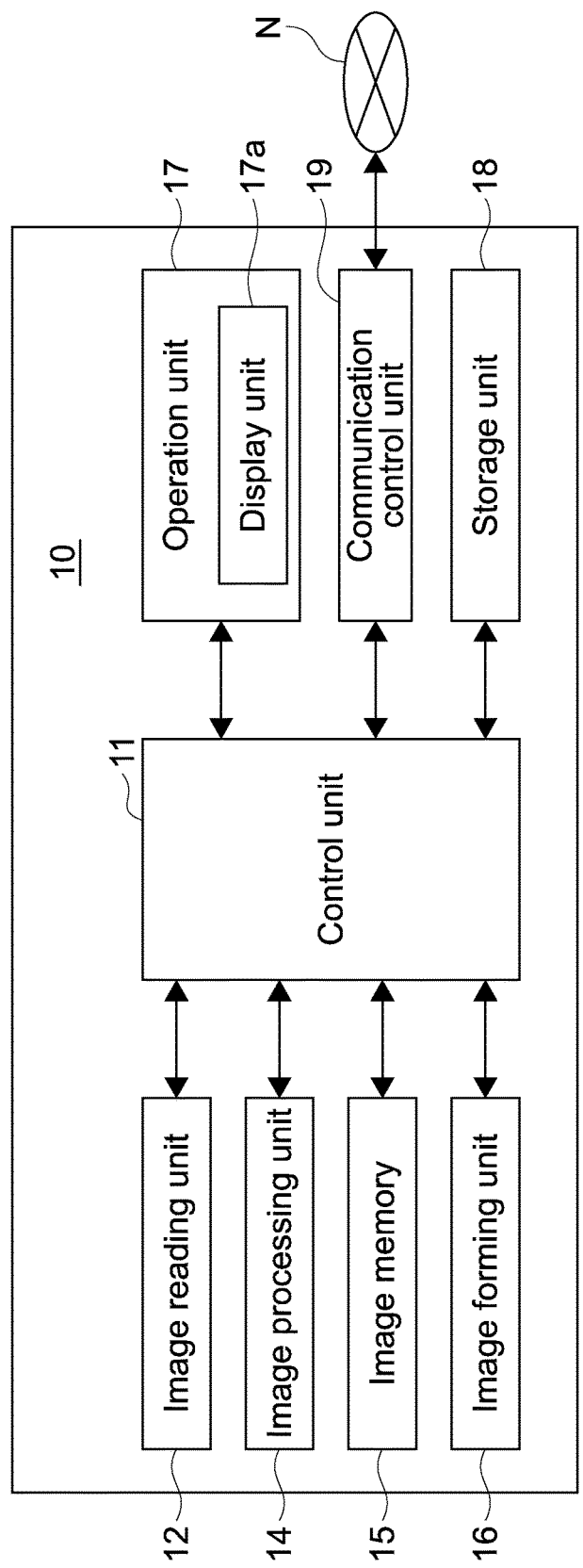
FIG. 3 shows a hardware structure of the MFP.

FIG. 3 shows a hardware structure of the MFP.

The MFP 10 includes a control unit 11. The control unit 11 is constituted of a CPU, a RAM, a ROM, a dedicated hardware circuit, and the like and performs overall operational control of the MFP 10. A computer program that causes the MFP 10 to function as the respective functional units (to be described later) is stored in a non-transitory computer readable recording medium such as a ROM.

The control unit 11 is connected to an image reading unit 12, an image processing unit 14, an image memory 15, an image forming unit 16, an operation unit 17, a storage unit 18, a communication control unit 19, and the like. The control unit 11 performs operational control of the connected respective units and exchanges signals and data with those units.

According to a job execution instruction input by a user via the operation unit 17 or a personal computer (not shown) connected to a network, the control unit 11 controls drive and processing of mechanisms requisite for executing operational control of functions such as a scanner function, a print function, and a copy function.

The image reading unit 12 is a scanner that reads an image from a script.

The image processing unit 14 carries out image processing as necessary on image data of an image read by the image reading unit 12. For example, the image processing unit 14 carries out image processing such as shading correction for improving quality after an image is formed based on the image read by the image reading unit 12.

The image memory 15 includes an area for temporarily storing data of a script image read by the image reading unit 12 or temporarily storing data to be printed by the image forming unit 16.

The image forming unit 16 forms an image of image data read by the image reading unit 12, and the like.

The operation unit 17 includes a touch panel unit and operation key unit that receive user instructions on various operations and processing executable by the MFP 10. The touch panel unit includes a display unit 17a such as an LCD (Liquid Crystal Display) provided with a touch panel.

The communication control unit 19 is an interface for connecting to the network N. The communication control unit 19 is a communication control circuit such as a network interface card.

The storage unit 18 is a large-capacity storage device such as an HDD, that stores a script image read by the image reading unit 12, and the like.

3. FUNCTIONAL STRUCTURE OF MFP

Figure 4:
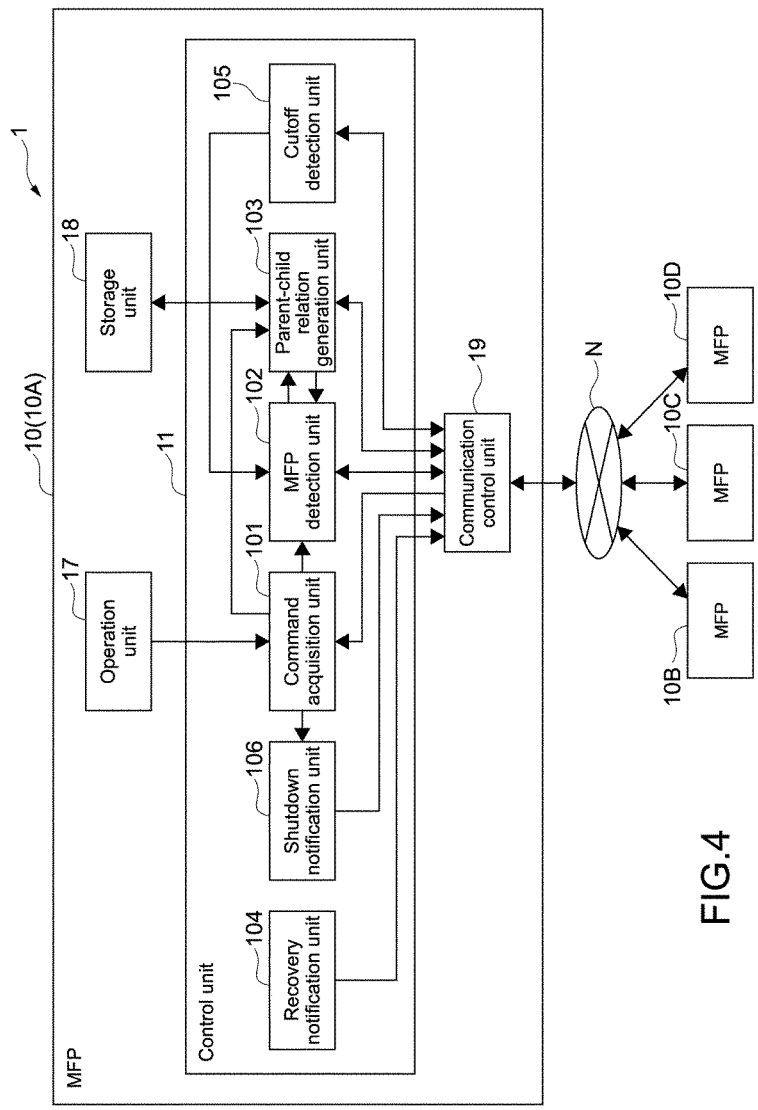
FIG. 4 shows a functional structure of the MFP.

FIG. 4 shows a functional structure of the MFP.

The MFPs 10 each include a command acquisition unit 101, an MFP detection unit 102, a parent-child relation generation unit 103, a recovery notification unit 104, a cutoff detection unit 105, and a shutdown notification unit 106. When executing the computer program of the MFP 10, the control unit 11 operates as the command acquisition unit 101, the MFP detection unit 102, the parent-child relation generation unit 103, the recovery notification unit 104, the cutoff detection unit 105, and the shutdown notification unit 106.

The command acquisition unit 101 acquires a family generation command and an MFP addition command.

Upon receiving a notification from the command acquisition unit 101, the MFP detection unit 102 searches for other MFPs 10 connected to the network N.

Upon acquiring identification information of the MFP 10 from the MFP detection unit 102, the parent-child relation generation unit 103 generates a parent-child relation with that MFP 10.

As the MFP 10 recovers from cutoff from the network, the recovery notification unit 104 notifies two MFPs 10 whose pieces of identification information are registered in the storage unit 18 as parent and child, of the recovery and commands the two MFPs 10 to generate (restore) the parent-child relation again.

The cutoff detection unit 105 periodically makes an inquiry to the MFP 10 as the child and periodically receives a response from the MFP 10 as the child. Consequently, the cutoff detection unit 105 periodically confirms that the parent-child relation is established.

The shutdown notification unit 106 notifies the two MFPs 10 for which the parent-child relations have been generated that the apparatus itself is scheduled to be shut down. The shutdown notification unit 106 also commands the two MFPs 10 for which the parent-child relations have been generated to generate a parent-child relation between those two MFPs 10.

4. OPERATIONS OF MFP

Hereinafter, for detailed descriptions, specific MFPs 10 will be referred to as "MFPs 10A, 10B, 10C, and 10D" and unspecific MFPs 10 will be referred to as "MFPs 10".

(4-1. Operations for Generating Family)

As a presupposition, the plurality of MFPs 10 are connected to the network N. The plurality of MFPs 10 have not generated parent-child relations yet, so a family (FIG. 2) is also not yet generated. Operations in which the plurality of MFPs 10 generate parent-child relations in this state so as to generate one family will be described.

(4-1-1. Operations of MFP that has Acquired Family Generation Command)

Figure 5:
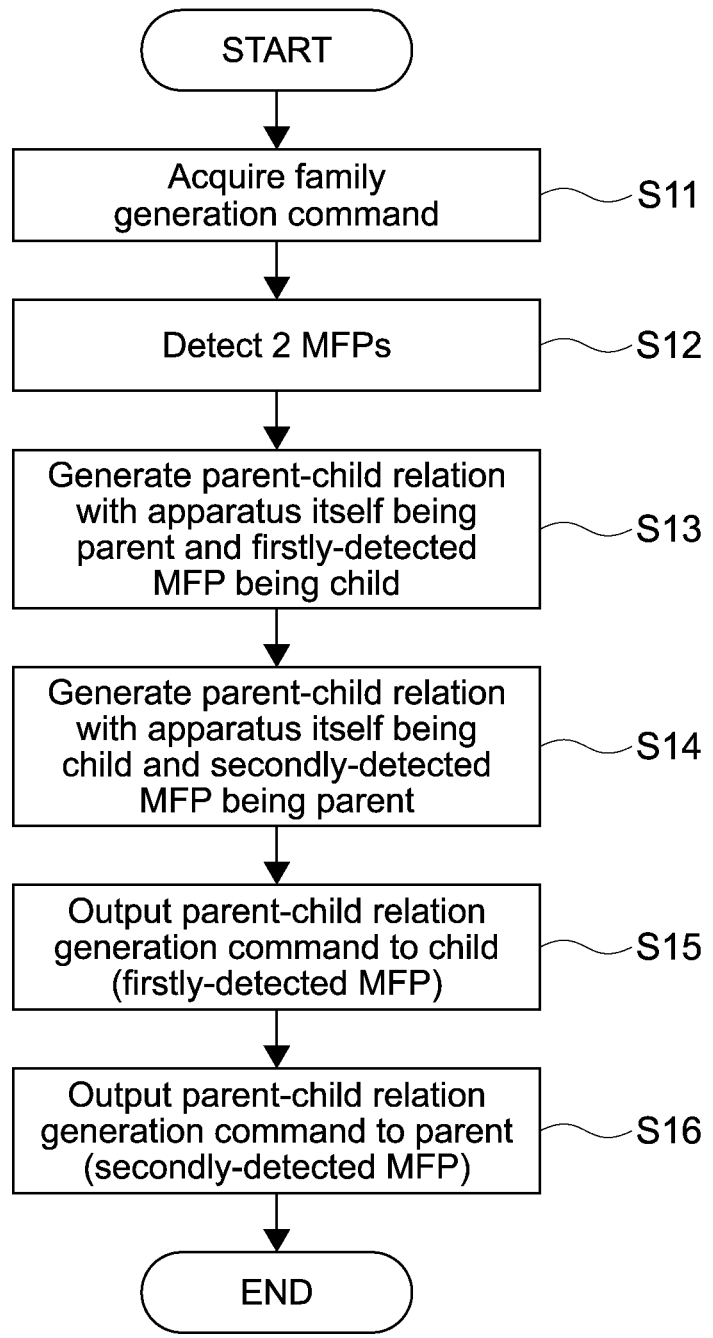
FIG. 5 shows operational steps of the MFP for generating a family.

FIG. 5 shows operational steps of the MFP that has acquired a family generation command.

The command acquisition unit 101 of the MFP 10A acquires a specific operation from a user with respect to the operation unit 17 as the family generation command (Step S11). The "family generation command" is a command for generating one family including all MFPs 10 connected to the network N. The command acquisition unit 101 notifies the MFP detection unit 102 that the family generation command has been acquired.

Upon receiving the notification from the command acquisition unit 101, the MFP detection unit 102 of the MFP 10A searches for the MFPs 10 connected to the network N. The MFP detection unit 102 supplies identification information of two MFPs 10 (MFPs 10B and 10C) that have been detected first out of the plurality of MFPs 10 connected to the network N, to the parent-child relation generation unit 103 in the detected order (Step S12).

Upon acquiring the identification information of the MFPs 10B and 10C from the MFP detection unit 102, the parent-child relation generation unit 103 of the MFP 10A generates a parent-child relation with the MFP 10A as the apparatus itself being a parent and the MFP 10B as an apparatus that has been detected first being a child (Step S13). Specifically, the parent-child relation generation unit 103 of the MFP 10A stores the identification information of the MFP 10B as the child in the storage unit 18. Then, the parent-child relation generation unit 103 of the MFP 10A commands the MFP 10B to store the identification information of the MFP 10A as the parent. Upon receiving the command from the MFP 10A, the MFP 10B stores the identification information of the MFP 10A as the parent and notifies the MFP 10A that the identification information has been stored. By the operations described above, the parent-child relation between the MFP 10A (parent) and the MFP 10B (child) is generated (parent-child 1 in FIG. 2).

Subsequently, the parent-child relation generation unit 103 of the MFP 10A generates a parent-child relation with the MFP 10A as the apparatus itself being a child and the MFP 10C as an apparatus that has been detected second being a parent (Step S14). Specifically, the parent-child relation generation unit 103 of the MFP 10A stores the identification information of the MFP 10C as the parent in the storage unit 18. Then, the parent-child relation generation unit 103 of the MFP 10A commands the MFP 10C to store the identification information of the MFP 10A as the child. Upon receiving the command from the MFP 10A, the MFP 10C stores the identification information of the MFP 10A as the child and notifies the MFP 10A that the identification information has been stored. By the operations described above, the parent-child relation between the MFP 10A (child) and the MFP 10C (parent) is generated (parent-child 2 in FIG. 2).

The parent-child relation generation unit 103 of the MFP 10A commands the MFP 10B (child for MFP 10A) for which the parent-child relation has been generated first (Step S13) to generate a parent-child relation with the MFP 10B being a parent and any of the MFPs 10 being a child (output parent-child relation generation command) (Step S15). The parent-child relation generation unit 103 also commands the MFP 10C (parent for MFP 10A) for which the parent-child relation has been generated second (Step S14) to generate a parent-child relation with the MFP 10C being a child and any of the MFPs 10 being a parent (output parent-child relation generation command) (Step S16).

(4-1-2. Operations of MFP that has Acquired Parent-Child Relation Generation Command)

Figure 6:
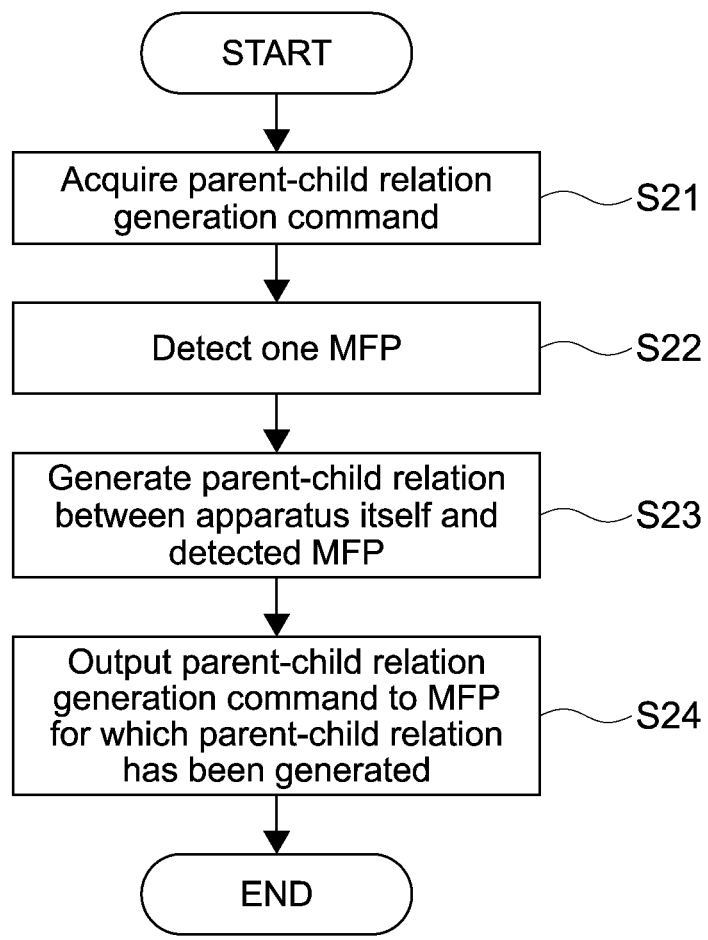
FIG. 6 shows operational steps of the MFP that has acquired a parent-child relation generation command.

FIG. 6 shows operational steps of the MFP that has acquired the parent-child relation generation command.

Upon acquiring the parent-child relation generation command (Step S15), the command acquisition unit 101 of the MFP 10B notifies the MFP detection unit 102 that the parent-child relation generation command has been acquired (Step S21).

Upon receiving the notification from the command acquisition unit 101, the MFP detection unit 102 of the MFP 10B transmits response requests to the other MFPs 10 by broadcast or multicast.

Upon acquiring the response request from the MFP 10B, each of the other MFPs 10 transmits response information to the MFP 10B. The response information includes identification information of the MFP 10 (apparatus itself) and the number of correspondence relations (0, 1, or 2) that the apparatus itself has already generated.

The MFP detection unit 102 of the MFP 10B acquires the response information from the MFPs 10. Based on the response information, the MFP detection unit 102 of the MFP 10B detects an MFP/MFPs 10 that has/have not generated a correspondence relation with two other MFPs 10. Specifically, the MFP detection unit 102 of the MFP 10B first detects an MFP/MFPs 10 that has/have not generated a correspondence relation with other MFPs 10 (number of correspondence relations=0) and then detects an MFP/MFPs 10 that has/have generated a correspondence relation with only one other MFP 10 (number of correspondence relations=1). The MFP detection unit 102 of the MFP 10B supplies identification information of the MFP 10 that has been detected first (i.e., MFP 10 having smallest number of generated correspondence relations) to the parent-child relation generation unit 103. At this time, when a plurality of MFPs 10 that have not generated a correspondence relation with other MFPs 10 (number of correspondence relations=0) are detected, the MFP detection unit 102 of the MFP 10B supplies identification information of the MFP 10 that has been detected the very first out of the plurality of detected MFPs 10, to the parent-child relation generation unit 103. Also when a plurality of MFPs 10 that have generated a correspondence relation with only one other MFP 10 (number of correspondence relations=1) are detected, the MFP detection unit 102 of the MFP 10B supplies identification information of the MFP 10 that has been detected the very first out of the plurality of detected MFPs 10, to the parent-child relation generation unit 103. Here, the MFP detection unit 102 of the MFP 10B may separately queue the response information for (number of correspondence relations=0) and the response information for (number of correspondence relations=1) in the acquired order so that the MFP detection unit 102 can first reference the response information for (number of correspondence relations=0) in the acquired order and then reference the response information for (number of correspondence relations=1) in the acquired order to detect the MFPs 10.

In this embodiment, the MFP detection unit 102 of the MFP 10B first detects the MFP 10C that has generated a correspondence relation with only the MFP 10A (number of correspondence relations=1) without detecting an MFP/MFPs 10 that has/have not generated a correspondence relation with other MFPs 10 (number of correspondence relations=0) (Step S22). The MFP detection unit 102 of the MFP 10B supplies the identification information of the MFP 10C that has been detected first to the parent-child relation generation unit 103.

Upon acquiring the identification information of the MFP 10C from the MFP detection unit 102, the parent-child relation generation unit 103 of the MFP 10B generates a parent-child relation with the MFP 10B as the apparatus itself being a parent and the detected MFP 10C being a child (Step S23). Specifically, the parent-child relation generation unit 103 of the MFP 10B stores the identification information of the MFP 10C as the child in the storage unit 18 and outputs a parent-child relation generation command to the MFP 10C to store the identification information of the MFP 10B as the parent. Upon receiving the command from the MFP 10B, the MFP 10C stores the identification information of the MFP 10B as the parent and notifies the MFP 10B that the identification information has been stored. By the operations described above, the parent-child relation is generated between the MFP 10B (parent) and the MFP 10C (child) (parent-child 3 in FIG. 2).

The parent-child relation generation unit 103 of the MFP 10B outputs, to the MFP 10C (child for MFP 10B) for which the parent-child relation has been generated (Step S23), a parent-child relation generation command to generate a parent-child relation with the MFP 10C being a parent and any of the MFPs 10 being a child (Step S24).

On the other hand, upon acquiring the parent-child relation generation command (Step S16), the MFP 10C carries out operations similar to those of Steps S21 to S24 (not shown). It should be noted that regarding Step S23 (generate parent-child relation with apparatus itself being parent and detected MFP being child), the MFP 10C generates a parent-child relation with the apparatus itself being a child and the detected MFP being a parent. Moreover, regarding Step S24 (command to generate parent-child relation with counterpart MFP that has generated parent-child relation being parent and any of MFPs being child), the MFP 10C outputs a parent-child relation generation command to generate a parent-child relation with the counterpart MFP that has generated the parent-child relation being a child and any of the MFPs being a parent (note that since the MFP 10C already stores identification information of the MFPs 10A and 10B as the parent and child in this example, this operation is not carried out).

When the correspondence relation with the MFP 10B is generated, the MFP 10C that has received the parent-child relation generation command from the MFP 10A (Step S16) cancels the operation that is based on the parent-child relation generation command even when the operation is being executed. Further, after the correspondence relation with the MFP 10B is generated, the MFP 10C that has acquired the parent-child relation generation command from the MFP 10A (Step S16) does not carry out the operation that is based on the parent-child relation generation command acquired from MFP 10A. In other words, when the MFP 10 that has acquired the parent-child relation generation command generates a correspondence relation with each of two other MFPs 10, that MFP 10 cancels the operation that is based on the parent-child relation generation command even when the operation is being executed. Moreover, after generating a correspondence relation with each of two other MFPs 10, the MFP 10 that has acquired the parent-child relation generation command does not carry out the operation that is based on the acquired parent-child relation generation command.

By repeating the operations of Steps S21 to S24 after the operations of Steps S11 to S16, all the MFPs 10 are connected annularly while extending in two directions (direction toward MFP 10B and direction toward MFP 10C) from the MFP 10A that has acquired a family generation command from a user. As a result, all the MFPs 10 generate one-on-one correspondence relations (parent-child relations) with two other MFPs 10. Accordingly, all the MFPs 10 are connected annularly to one another on an equal (no server and the like) footing so as to generate one family.

(4-2. Operations for Adding MFP to Family)

Figure 7:
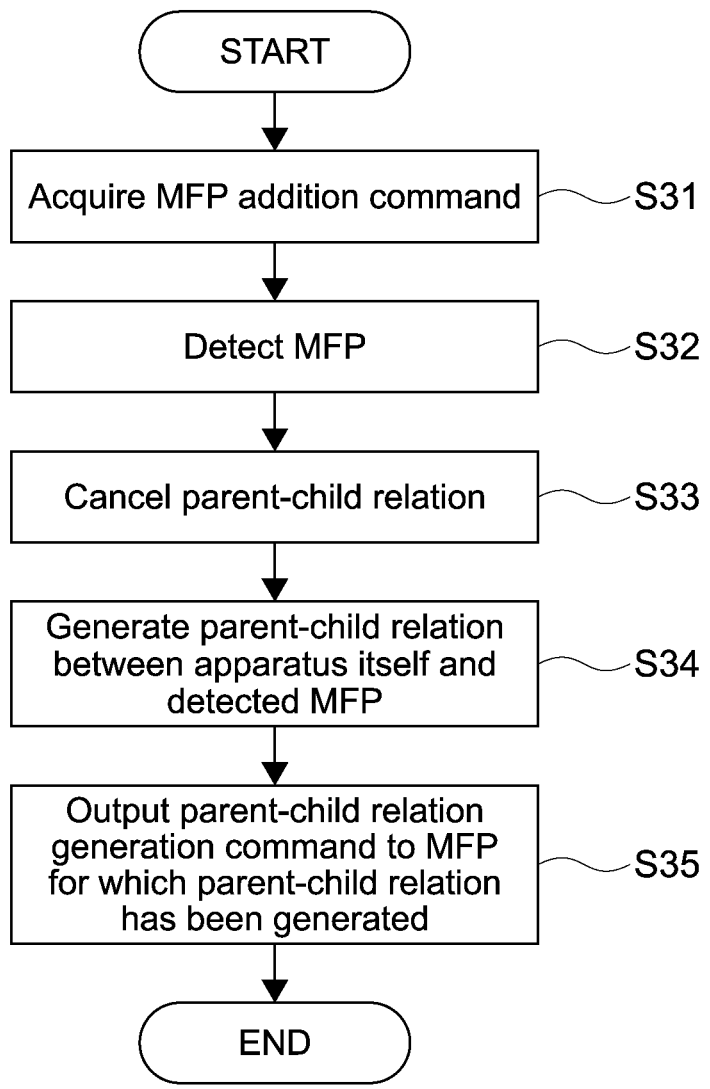
FIG. 7 shows operational steps of the MFP for newly adding an MFP to a family.
Figure 8:
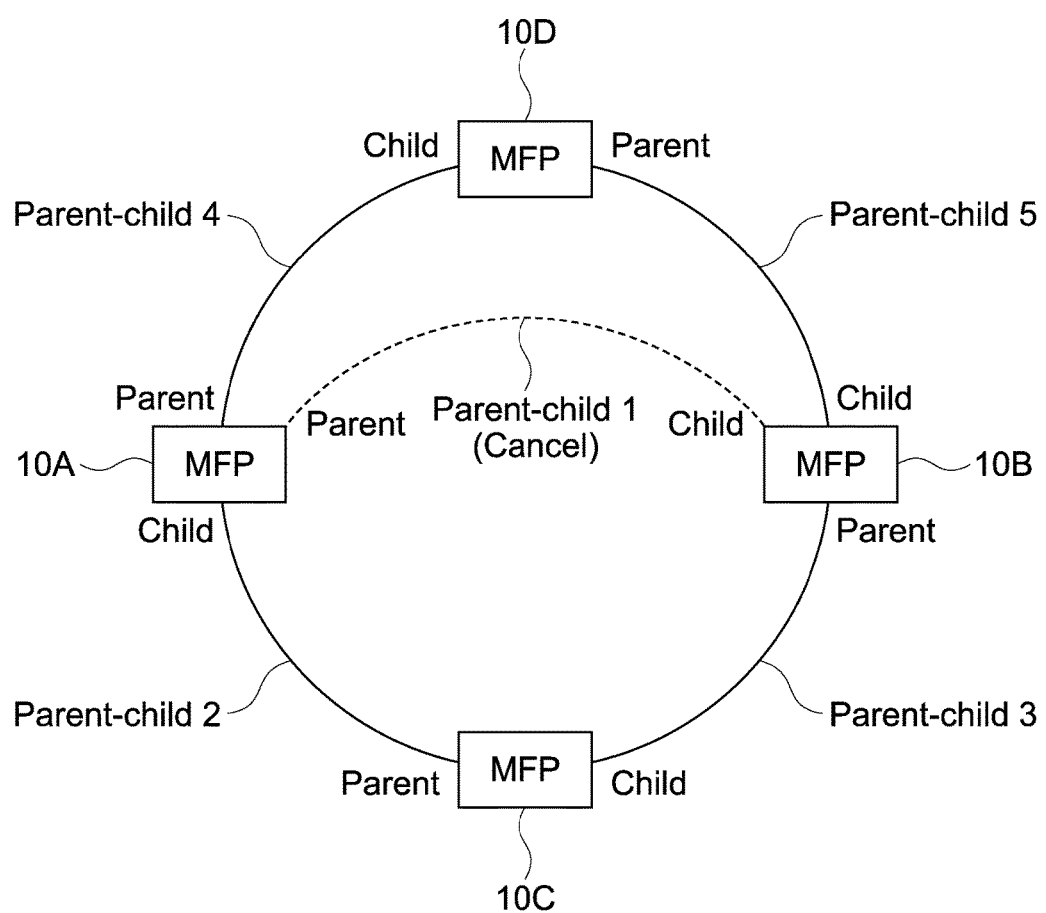
FIG. 8 is a schematic diagram for explaining the family to which an MFP is newly added.

FIG. 7 shows operational steps of the MFP for newly adding an MFP to a family. FIG. 8 is a schematic diagram for explaining the family to which an MFP is newly added.

Operations for adding a new MFP 10 to the family including the MFPs 10A to 10C (FIG. 2) afterwards will be described.

The command acquisition unit 101 of the MFP 10A acquires a specific operation made by the user via the operation unit 17 as an MFP addition command (Step S31). The "MFP addition command" is a command for newly adding an MFP 10 to the already-generated family. The command acquisition unit 101 notifies the MFP detection unit 102 that the MFP addition command has been acquired.

Upon receiving the notification from the command acquisition unit 101, the MFP detection unit 102 of the MFP 10A searches for the MFP 10 newly connected to the network N. Upon detecting the MFP 10 (MFP 10D herein) (Step S32), the MFP detection unit 102 supplies identification information of the detected MFP 10D to the parent-child relation generation unit 103.

Upon acquiring the identification information of the MFP 10D from the MFP detection unit 102, the parent-child relation generation unit 103 of the MFP 10A deletes the identification information of the MFP 10B as the child, that is stored in the storage unit 18. Then, the parent-child relation generation unit 103 commands the MFP 10B to delete the identification information of the MFP 10A stored as the parent. Accordingly, the parent-child relation between the MFP 10A (parent) and the MFP 10B (child) is canceled (Step S33, parent-child 1 in FIG. 8).

The parent-child relation generation unit 103 of the MFP 10A stores the identification information of the newly-detected MFP 10D in the storage unit 18 as a child. Further, the parent-child relation generation unit 103 commands the MFP 10D to store the identification information of the MFP 10A as a parent. Upon receiving the command from the MFP 10A, the MFP 10D stores the identification information of the MFP 10A as the parent and notifies the MFP 10A that the identification information has been stored. By the operations described above, a parent-child relation is generated between the MFP 10A (parent) and the MFP 10D (child) (Step S34, parent-child 4 in FIG. 8).

The parent-child relation generation unit 103 of the MFP 10A outputs, to the MFP 10D for which the parent-child relation has been generated (Step S34), a parent-child relation generation command to generate a parent-child relation with the MFP 10B for which the parent-child relation has been canceled (Step S33) being a child (Step S35).

The command acquisition unit 101 of the MFP 10D acquires the parent-child relation generation command (Step S35). The command acquisition unit 101 then notifies the parent-child relation generation unit 103 that the parent-child relation generation command has been acquired. The parent-child relation generation unit 103 of the MFP 10D stores the identification information of the MFP 10B as commanded in the storage unit 18 as a child. Further, the parent-child relation generation unit 103 commands the MFP 10B to store the identification information of the MFP 10D as a parent. Upon receiving the command from the MFP 10D, the MFP 10B stores the identification information of the MFP 10D as the parent and notifies the MFP 10D that the identification information has been stored. By the operations described above, a parent-child relation is generated between the MFP 10D (parent) and the MFP 10B (child) (parent-child 5 in FIG. 8).

By the operations described above, all the MFPs 10A to 10D generate one-on-one correspondence relations (parent-child relations) with two other MFPs 10A to 10D. Accordingly, all the MFPs 10A to 10D are connected annularly to one another on an equal (no server and the like) footing, and one family is enlarged.

It should be noted that the parent-child relation generation unit 103 of the MFP 10A may command, in place of Step S35 above, the MFP 10B for which the parent-child relation has been canceled (Step S33) to generate a parent-child relation with the MFP 10D for which the parent-child relation has been generated (Step S34) being a parent.

It should be noted that when a plurality of MFPs 10 are newly connected to the network N, the operations of Steps S31 to S35 only need to be repeated.

(4-2-1. Modified Example 1 of Operations for Adding MFP to Family)

Other operations for adding a new MFP 10 to the family including the MFPs 10A to 10C (FIG. 2) afterwards will be described.

In "4-2. Operations for adding MFP to family", the MFP 10A cancels the parent-child relation with the MFP 10B, generates a parent-child relation with the MFP 10D afterwards, and outputs a parent-child relation generation command to generate a parent-child relation with the MFP 10B to the MFP 10D.

In contrast, in Modified Example 1, the MFP 10A outputs a parent-child relation generation command to not only the MFP 10D but also the MFP 10B. Specifically, the MFP 10A commands the MFP 10D for which the parent-child relation has been generated (Step S34) to generate a parent-child relation with the MFP 10D being a parent and any of the MFPs 10 being a child (output parent-child relation generation command) (similar to Step S15). The MFP 10A also commands the MFP 10B for which the parent-child relation has been canceled (Step S33) to generate a parent-child relation with the MFP 10B being a child and any of the MFPs 10 being a parent (output parent-child relation generation command) (similar to Step S16).

The MFPs 10D and 10B that have acquired the parent-child relation generation command each carry out operations similar to those of Steps S21 to S24. As a result, all the MFPs 10 generates one-on-one correspondence relations (parent-child relations) with two other MFPs 10. Accordingly, all the MFPs 10 are connected annularly to one another on an equal (no server and the like) footing so as to generate one family.

In "4-2. Operations for adding MFP to family", the MFP 10A outputs, to the MFP 10D, the parent-child relation generation command to generate a parent-child relation with the MFP 10B for which the parent-child relation has been canceled (Step S33) (Step S35). In other words, a case where one MFP 10 (MFP 10D) is added to a family afterwards is assumed. In contrast, according to Modified Example 1, the MFP 10A outputs a parent-child relation generation command to generate a parent-child relation with any of the MFPs 10 to each of the MFPs 10B and 10D. Accordingly, it becomes possible to add a plurality of MFPs 10 to a family afterwards.

(4-2-2. Modified Example 2 of Operations for Adding MFP to Family)

In "4-2. Operations for adding MFP to family", the MFP 10A detects one MFP 10 (MFP 10D) newly connected to the network N (Step S32). In contrast, in Modified Example 2, the MFP 10A generates a parent-child relation afterwards with the MFP 10 that has been detected first out of at least one MFP 10 that has not generated a correspondence relation with other MFPs 10.

After Step S31, upon receiving a notification from the command acquisition unit 101, the MFP detection unit 102 of the MFP 10A transmits response requests to other MFPs 10 by broadcast or multicast.

Upon acquiring the response request from the MFP 10A, the other MFPs 10 each transmit response information to the MFP 10A. The response information includes identification information of the MFP 10 (apparatus itself) and the number of already-generated correspondence relations (0, 1, or 2).

The MFP detection unit 102 of the MFP 10A acquires the response information from the MFPs 10. Based on the response information, the MFP detection unit 102 of the MFP 10A detects an MFP/MFPs 10 that has/have not yet generated correspondence relations with two other MFPs 10. Specifically, the MFP detection unit 102 of the MFP 10A first detects an MFP/MFPs 10 that has/have not yet generated correspondence relations with other MFPs 10 (number of correspondence relations=0) and then detects an MFP/MFPs 10 that has/have generated a correspondence relation with only one other MFP 10 (number of correspondence relations=1). The MFP detection unit 102 of the MFP 10A supplies identification information of the MFP 10 that has been detected first (MFP 10D in this example) to the parent-child relation generation unit 103.

Upon acquiring the identification information of the MFP 10D from the MFP detection unit 102, the parent-child relation generation unit 103 of the MFP 10A deletes identification information of the MFP 10B as a child, that is stored in the storage unit 18. Then, the parent-child relation generation unit 103 commands the MFP 10B to delete the identification information of the MFP 10A as the parent.

Accordingly, the parent-child relation between the MFP 10A (parent) and the MFP 10B (child) is canceled (Step S33, parent-child 1 in FIG. 8).

The parent-child relation generation unit 103 of the MFP 10A stores the identification information of the newly-detected MFP 10D in the storage unit 18 as a child. Further, the parent-child relation generation unit 103 commands the MFP 10D to store the identification information of the MFP 10A as a parent. Upon receiving the command from the MFP 10A, the MFP 10D stores the identification information of the MFP 10A as the parent and notifies the MFP 10A that the identification information has been stored. By the operations described above, the parent-child relation is generated between the MFP 10A (parent) and the MFP 10D (child) (Step S34, parent-child 4 in FIG. 8).

As in Modified Example 1, the parent-child relation generation unit 103 of the MFP 10A commands the MFP 10D for which the parent-child relation has been generated (Step S34) to generate a parent-child relation with the MFP 10D being a parent and any of the MFPs 10 being a child (output parent-child relation generation command) (similar to Step S15). The MFP 10A also commands the MFP 10B for which the parent-child relation has been canceled (Step S33) to generate a parent-child relation with the MFP 10B being a child and any of the MFPs 10 being a parent (output parent-child relation generation command) (similar to Step S16).

The MFPs 10D and 10B that have acquired the parent-child relation generation command each carry out operations similar to those of Steps S21 to S24. As a result, all the MFPs 10 generate one-on-one correspondence relations (parent-child relations) with two other MFPs 10. Accordingly, all the MFPs 10 are connected annularly to one another on an equal (no server and the like) footing so as to generate one family.

Also by Modified Example 2, it becomes possible to add a plurality of MFPs 10 to a family afterwards.

(4-3. Operations of MFP that has Generated Parent-Child Relation with MFP Cut Off from Network)

Figure 9:
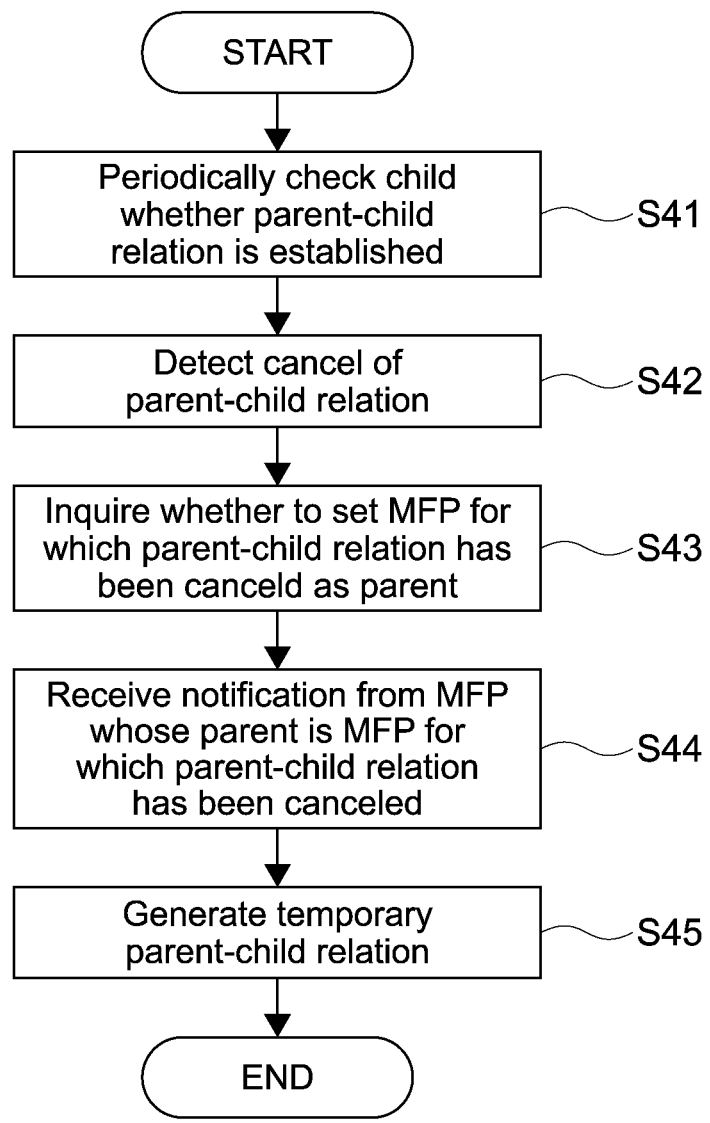
FIG. 9 shows operational steps of the MFP that has generated a parent-child relation with an MFP cut off from a network.
Figure 10:
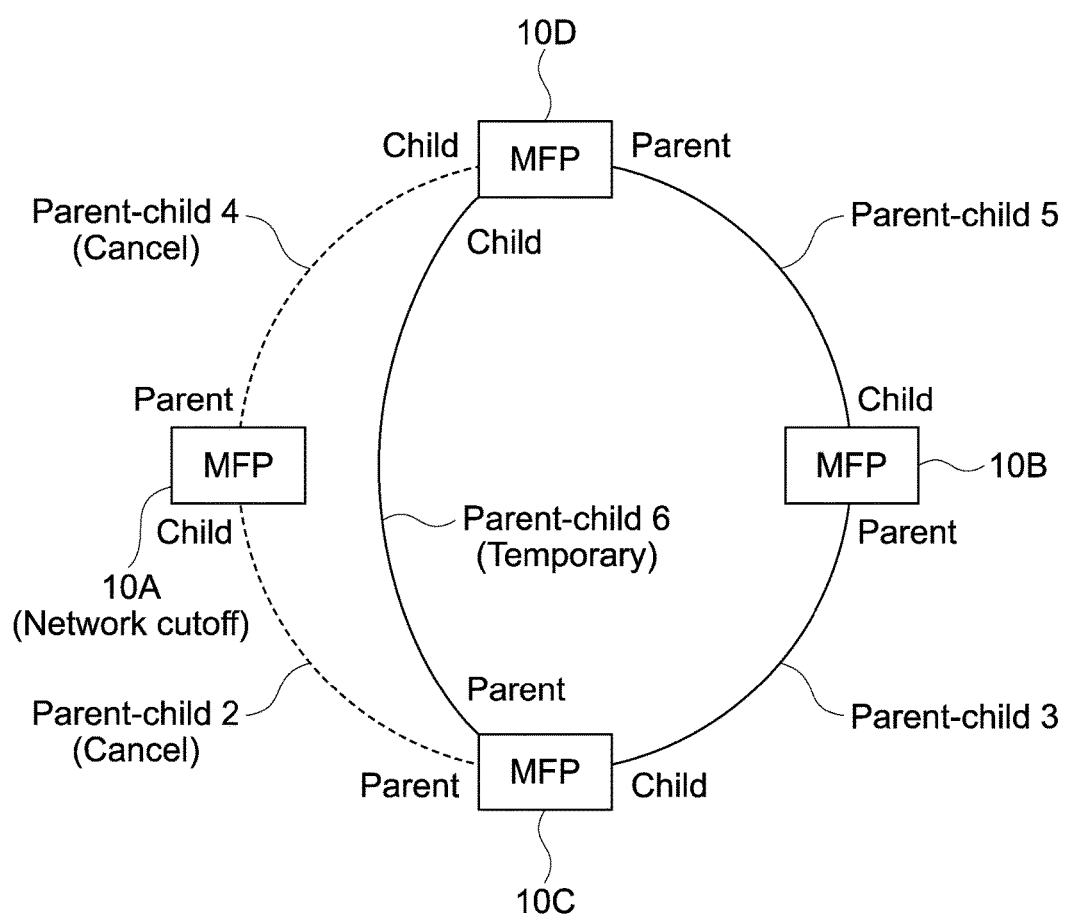
FIG. 10 is a schematic diagram for explaining cutoff of the MFP included in the family from the network.

FIG. 9 shows operational steps of the MFP that has generated a parent-child relation with an MFP cut off from a network. FIG. 10 is a schematic diagram for explaining cutoff of the MFP included in the family from the network.

A case where the MFP 10A included in the family shown in FIG. 8 is accidentally cut off from the network due to a failure of a network apparatus, or the like will be discussed.

The cutoff detection unit 105 of each of the MFPs 10 that have already generated parent-child relations periodically makes an inquiry to the MFP 10 as a child and periodically receives a response from the MFP 10 as the child to confirm that the parent-child relation is established.

As a specific individual example, the cutoff detection unit 105 of the MFP 10C periodically makes an inquiry to the MFP 10A as the child and periodically receives a response from the MFP 10A as the child to periodically confirm that the parent-child relation is established (Step S41). When a response is not received from the MFP 10A as the child, the cutoff detection unit 105 of the MFP 10C detects that the parent-child relation with the MFP 10A (parent-child 2 in FIG. 10) has been cut off due to a cutoff from the network (Step S42). Then, the cutoff detection unit 105 notifies the MFP detection unit 102 that the parent-child relation with the MFP 10A as the child has been canceled.

The MFP detection unit 102 of the MFP 10C makes an inquiry to all the MFPs 10 in the family as to whether the parent is the MFP 10A, for which the parent-child relation has been canceled (cut off from network), by broadcast (Step S43). The MFP detection unit 102 of the MFP 10C receives a notification notifying that the MFP 10A is the parent from the MFP 10D (Step S44). At this time, the parent-child relation between the MFP 10A (parent) and the MFP 10D (child) (parent-child 4 in FIG. 10) is already canceled (since MFP 10A has been cut off from network). The MFP detection unit 102 of the MFP 10C notifies the parent-child relation generation unit 103, of the identification information of the MFP 10D as the notification source.

Upon receiving the notification from the MFP detection unit 102, the parent-child relation generation unit 103 of the MFP 10C stores the notified identification information of the MFP 10D in the storage unit 18 as a child and commands the MFP 10D to store the identification information of the MFP 10C as a parent. Upon receiving the command from the MFP 10C, the MFP 10D stores the identification information of the MFP 10C as the parent and notifies the MFP 10C that the identification information has been stored. By the operations described above, a temporary parent-child relation between the MFP 10C (parent) and the MFP 10D (child) is generated (Step S45, parent-child 6 in FIG. 10).

(4-4. Operations when MFP Recovers from Cutoff)

(4-4-1. Operations of MFP that Recovers from Cutoff)

Figure 11:
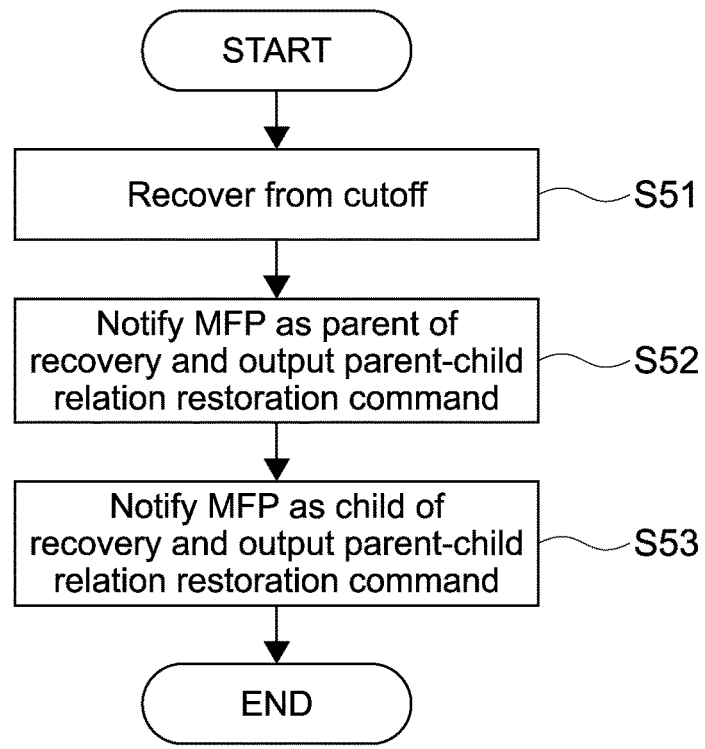
FIG. 11 shows operational steps of the MFP recovering from the cutoff.

FIG. 11 shows operational steps of the MFP recovering from the cutoff.

As the MFP 10A recovers from a cutoff (Step S51), the recovery notification unit 104 of the MFP 10A commands, as well as notify the MFP 10C whose identification information as a parent is registered in the storage unit 18 that the MFP 10A has recovered, the MFP 10C to generate (restore) a parent-child relation again with the MFP 10C being a parent and the MFP 10A being a child (Step S52). Further, the recovery notification unit 104 commands, as well as notify the MFP 10D whose identification information as a child is registered in the storage unit 18 that the MFP 10A has recovered, the MFP 10D to generate (restore) a parent-child relation again with the MFP 10D being a child and the MFP 10A being a parent (Step S53).

(4-4-2. Operations of MFP that has Generated Parent-Child Relation with MFP Recovering from Cutoff).

Figure 12:
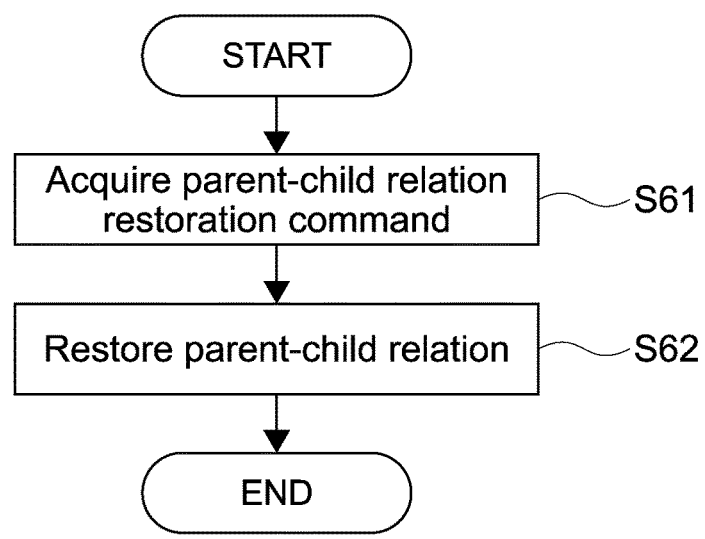
FIG. 12 shows operational steps of the MFP that has generated a parent-child relation with the MFP that is to recover from the cutoff.

FIG. 12 shows operational steps of the MFP that has generated a parent-child relation with the MFP recovering from a cutoff.

Upon acquiring a parent-child relation restoration command from the MFP 10A (Step S52) (Step S61), the command acquisition unit 101 of the MFP 10C notifies the parent-child relation generation unit 103 that the parent-child relation restoration command has been acquired. Then, the parent-child relation generation unit 103 of the MFP 10C deletes the identification information of the MFP 10D as a temporary child, that is stored in the storage unit 18. The parent-child relation generation unit 103 of the MFP 10C stores the identification information of the MFP 10A again in the storage unit 18 as a child and notifies the MFP 10A that the identification information has been stored. By the operations described above, the parent-child relation between the MFP 10C (parent) and the MFP 10A (child) is generated again (restored) (Step S62, parent-child 2 in FIG. 10).

On the other hand, upon acquiring the parent-child relation restoration command from the MFP 10A (Step S53) (Step S61), the command acquisition unit 101 of the MFP 10D notifies the parent-child relation generation unit 103 that the parent-child relation restoration command has been acquired. Then, the parent-child relation generation unit 103 of the MFP 10D deletes the identification information of the MFP 10C as a temporary parent, that is stored in the storage unit 18. Accordingly, the temporary parent-child relation between the MFP 10C (parent) and the MFP 10D (child) (parent-child 6 in FIG. 10) is canceled. The parent-child relation generation unit 103 of the MFP 10D stores the identification information of the MFP 10A again in the storage unit 18 as a parent and notifies the MFP 10A that the identification information has been stored. By the operations described above, the parent-child relation between the MFP 10D (child) and the MFP 10A (parent) is generated again (restored) (Step S62, parent-child 4 in FIG. 10).

It should be noted that when some MFPs 10 in a family are cut off from the network or other cases, one MFP 10 that has recovered from the cutoff may not be able to notify the parent or child of the recovery. In such a case, the MFP 10 that has recovered from the cutoff commands all the MFPs 10 connected within the family to discard the family by broadcast and generates a family again starting from the MFP 10 that has recovered from the cutoff.

In this embodiment, as the MFP 10A recovers from the cutoff, the temporary parent-child relation is immediately canceled, and the parent-child relation is restored to that before the cutoff. Alternatively, it is possible to maintain the temporary parent-child relation after the MFP 10A recovers from the cutoff and restore the parent-child relation to that before the cutoff after a certain period of time.

In this embodiment, upon recovering from the cutoff, the MFP 10A notifies the MFP 10C whose identification information as a parent is registered and the MFP 10D whose identification information as a child is registered, of the recovery, and supplies the parent-child relation restoration command to the MFPs 10C and 10D. Alternatively, it is possible to notify at least one of the MFPs 10 whose identification information is registered, of the recovery and supply a parent-child relation restoration command to that MFP 10.

For example, the MFP 10A only needs to notify only the MFP 10C whose identification information as the parent is registered, of the recovery and supply the parent-child relation restoration command to the MFP 10C. Consequently, the MFP 10C cancels the temporary parent-child relation with the MFP 10D and restores the parent-child relation with the MFP 10A. On the other hand, the MFP 10D only needs to detect the MFP 10A and newly generate a parent-child relation with the MFP 10A after the temporary parent-child relation with the MFP 10C is canceled.

(4-5. Operations when Shutting Down MFP)

(4-5-1. Operations of MFP when Shutting Down)

Figure 13:
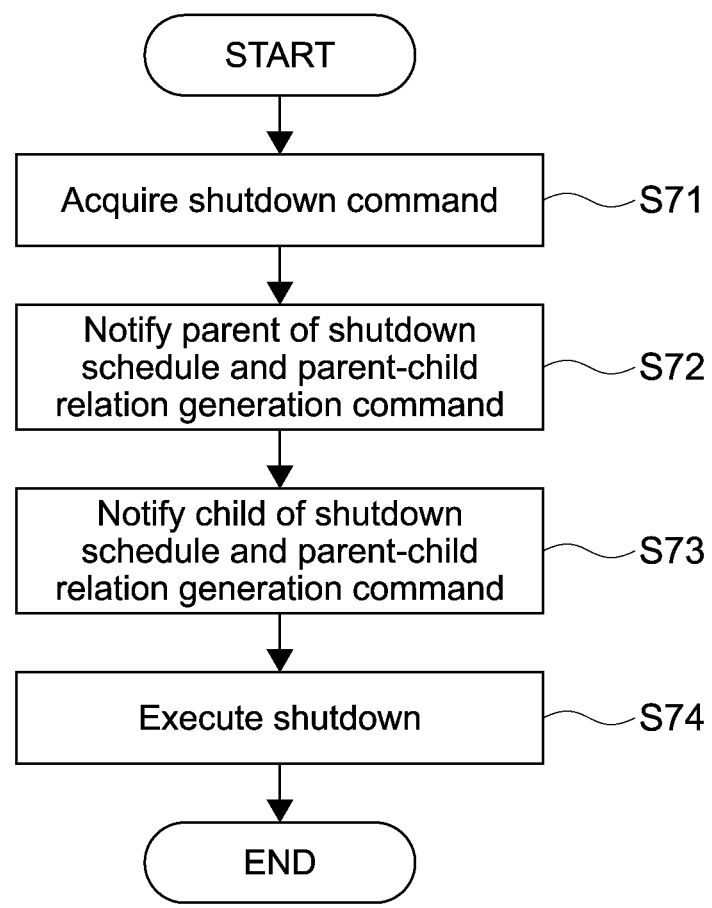
FIG. 13 shows operational steps of the MFP to be shut down.
Figure 14:
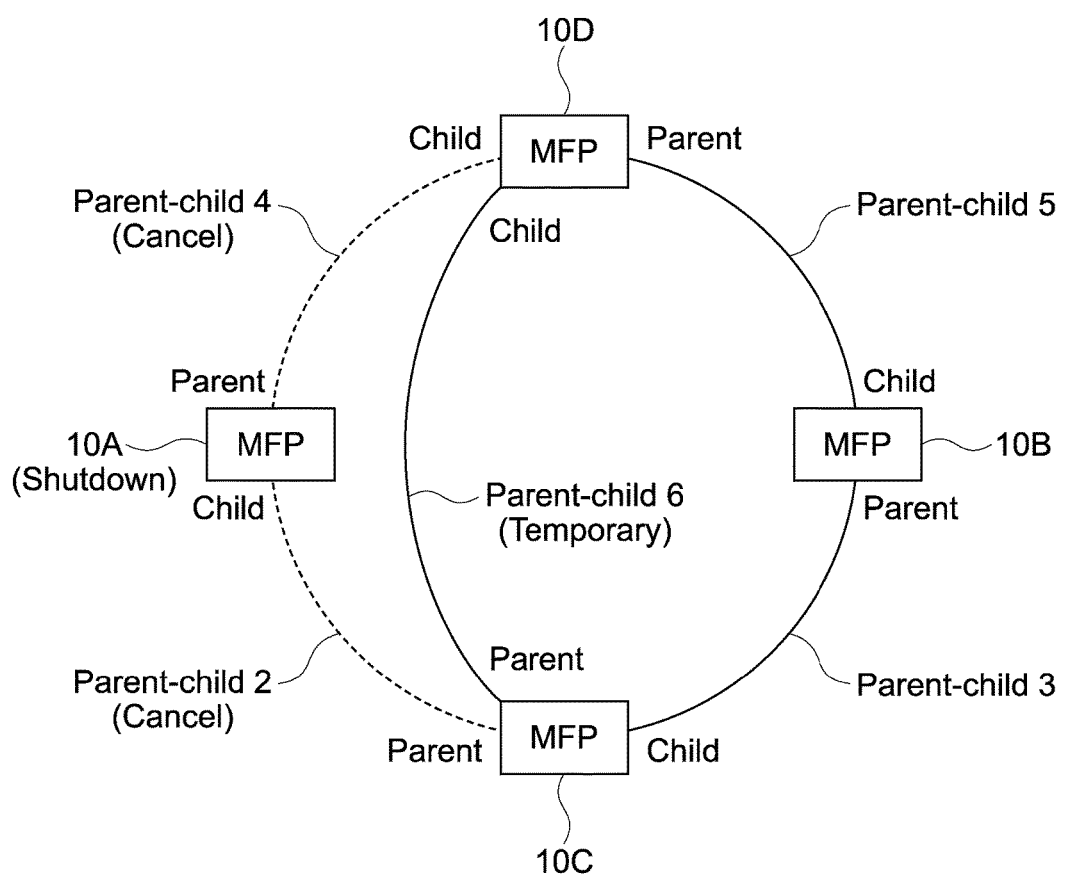
FIG. 14 is a schematic diagram for explaining shutdown of the MFP included in the family.

FIG. 13 shows operational steps of the MFP to be shut down. FIG. 14 is a schematic diagram for explaining the shutdown of the MFP included in the family.

A case where the MFP 10A included in the family shown in FIG. 8 is normally shut down based on a shutdown command from a user will be discussed.

The command acquisition unit 101 of the MFP 10A acquires a specific operation made by the user via the operation unit 17 as a shutdown command (Step S71). The command acquisition unit 101 notifies the shutdown notification unit 106 that the shutdown command has been acquired.

Upon receiving the notification from the command acquisition unit 101, the shutdown notification unit 106 of the MFP 10A notifies the MFP 10C as the parent of the MFP 10A that the MFP 10A is scheduled to be shut down. Further, the shutdown notification unit 106 of the MFP 10A commands the MFP 10C to generate a parent-child relation with the MFP 10C being a parent and the MFP 10D as a child of the MFP 10A being a child (Step S72).

The shutdown notification unit 106 of the MFP 10A notifies the MFP 10D as the child of the MFP 10A that the MFP 10A is scheduled to be shut down. Further, the shutdown notification unit 106 of the MFP 10A commands the MFP 10D to generate a parent-child relation with the MFP 10D being a child and the MFP 10C as a parent of the MFP 10A being a parent (Step S73).

As the shutdown notification unit 106 of the MFP 10A outputs the parent-child relation generation command (Steps S72 and S73), the MFP 10A executes shutdown (Step S74). It should be noted that even when the MFP 10A executes shutdown, the identification information of the MFP 10C as the parent and the identification information of the MFP 10D as the child are stored in the storage unit 18 of the MFP 10A.

(4-5-2. Operations of MFP that has Generated Parent-Child Relation with MFP to be Shut Down)

Figure 15:
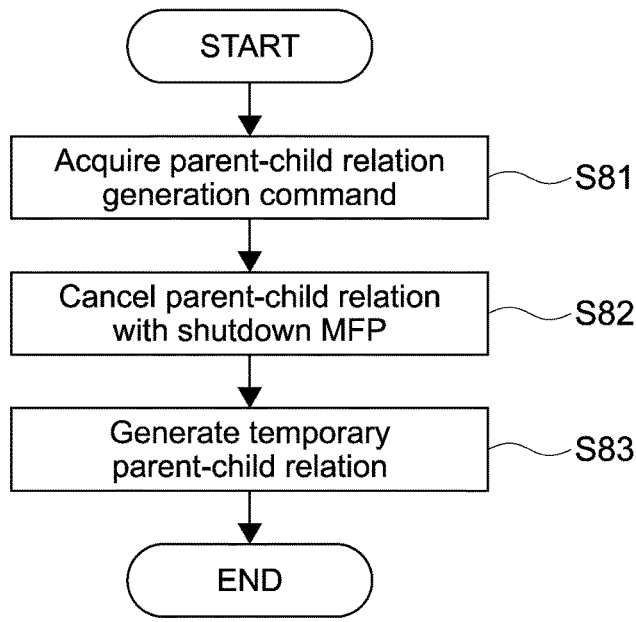
FIG. 15 shows operational steps of the MFP that has generated a parent-child relation with the MFP to be shut down.

FIG. 15 shows operational steps of the MFP that has generated a parent-child relation with the MFP to be shut down.

The command acquisition unit 101 of the MFP 10C acquires the parent-child relation generation command from the MFP 10A as the child of the MFP 10C (Step S72) (Step S81). Then, the command acquisition unit 101 notifies the parent-child relation generation unit 103 that the parent-child relation generation command has been acquired.

Upon receiving the notification from the command acquisition unit 101, the parent-child relation generation unit 103 of the MFP 10C deletes the identification information of the MFP 10A stored as the child from the storage unit 18. Accordingly, the parent-child relation between the MFP 10C (parent) and the MFP 10A (child) is canceled (Step S82, parent-child 2 in FIG. 14).

The parent-child relation generation unit 103 of the MFP 10C stores, as a temporary child in the storage unit 18, the identification information of the MFP 10D notified by the MFP 10A (Step S72) (Step S83).

On the other hand, the command acquisition unit 101 of the MFP 10D acquires the parent-child relation generation command from the MFP 10A as the parent of the MFP 10D (Step S73) (Step S81). Then, the command acquisition unit 101 notifies the parent-child relation generation unit 103 that the parent-child relation generation command has been acquired.

Upon receiving the notification from the command acquisition unit 101, the parent-child relation generation unit 103 of the MFP 10D deletes the identification information of the MFP 10A stored as the parent from the storage unit 18. Accordingly, the parent-child relation between the MFP 10A (parent) and the MFP 10D (child) is canceled (Step S82, parent-child 4 in FIG. 14).

The parent-child relation generation unit 103 of the MFP 10D stores, as a temporary parent in the storage unit 18, the identification information of the MFP 10C notified by the MFP 10A (Step S73) (Step S83). Accordingly, the temporary parent-child relation between the MFP 10C (parent) and the MFP 10D (child) is generated (parent-child 6 in FIG. 14).

(4-6. Operations when MFP Recovers from Shutdown)

(4-6-1. Operations of MFP Recovering from Shutdown)

Figure 16:
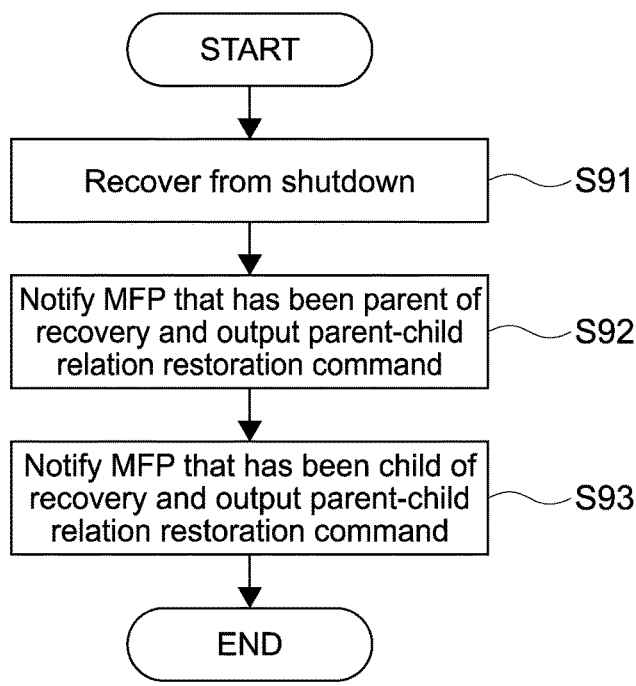
FIG. 16 shows operational steps of the MFP that is to recover from the shutdown.

FIG. 16 shows operational steps of the MFP that recovers from the shutdown.

As the MFP 10A recovers from the shutdown (Step S91), the shutdown notification unit 106 of the MFP 10A notifies the MFP 10C whose identification information as the parent is registered in the storage unit 18 that the MFP 10A has recovered, and commands the MFP 10C to generate (restore) the parent-child relation again with the MFP 10C being a parent and the MFP 10A being a child (Step S92). Further, the shutdown notification unit 106 notifies the MFP 10D whose identification information as the child is registered in the storage unit 18 that the MFP 10A has recovered, and commands the MFP 10D to generate (restore) the parent-child relation again with the MFP 10D being a child and the MFP 10A being a parent (Step S93).

(4-6-2. Operations of MFP that has Generated Parent-Child Relation with MFP that is to Recover from Shutdown)

Figure 17:
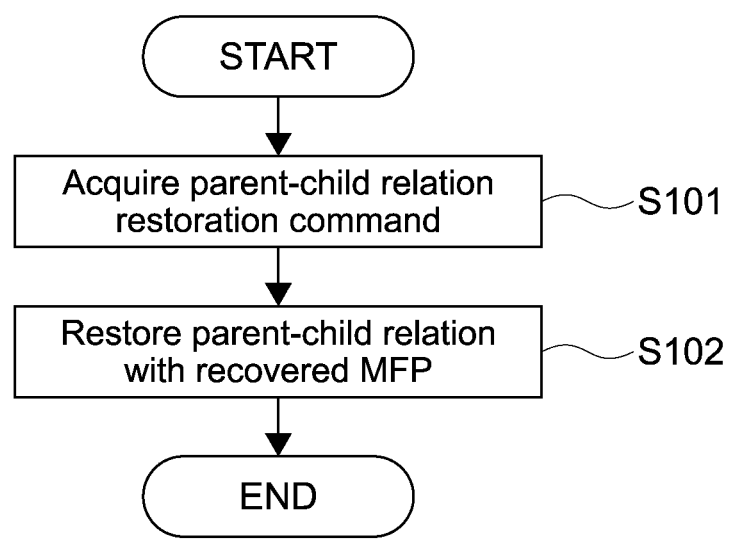
FIG. 17 shows operational steps of the MFP that has generated a parent-child relation with the MFP that is to recover from the shutdown.

FIG. 17 shows operational steps of the MFP that has generated a parent-child relation with the MFP that is to recover from the shutdown.

Upon acquiring the parent-child relation restoration command from the MFP 10A (Step S92) (Step S101), the command acquisition unit 101 of the MFP 10C notifies the parent-child relation generation unit 103 that the parent-child relation restoration command has been acquired. Then, the parent-child relation generation unit 103 of the MFP 10C deletes the identification information of the MFP 10D as the temporary child, that is stored in the storage unit 18. The parent-child relation generation unit 103 stores the identification information of the MFP 10A again in the storage unit 18 as the child and notifies the MFP 10A that the identification information has been stored. By the operations described above, the parent-child relation between the MFP 10C (parent) and the MFP 10A (child) is generated again (restored) (Step S102, parent-child 2 in FIG. 14).

On the other hand, upon acquiring the parent-child relation restoration command from the MFP 10A (Step S93) (Step S101), the command acquisition unit 101 of the MFP 10D notifies the parent-child relation generation unit 103 that the parent-child relation restoration command has been acquired. Then, the parent-child relation generation unit 103 of the MFP 10D deletes the identification information of the MFP 10C as the temporary parent, that is stored in the storage unit 18. Accordingly, the temporary parent-child relation between the MFP 10C (parent) and the MFP 10D (child) is canceled (parent-child 6 in FIG. 14). The parent-child relation generation unit 103 stores the identification information of the MFP 10A again in the storage unit 18 as the parent and notifies the MFP 10A that the identification information has been stored. By the operations described above, the parent-child relation between the MFP 10D (child) and the MFP 10A (parent) is generated again (restored) (Step S102, parent-child 4 in FIG. 14).

In this embodiment, as the MFP 10A recovers from the shutdown, the temporary parent-child relation is immediately canceled, and the parent-child relation is restored to that before the shutdown. Alternatively, it is possible to maintain the temporary parent-child relation after the MFP 10A recovers from the shutdown and restore the parent-child relation to that before the shutdown after a certain period of time.

In this embodiment, upon recovering from the shutdown, the MFP 10A notifies the MFP 10C whose identification information as a parent is registered and the MFP 10D whose identification information as a child is registered, of the recovery, and supplies the parent-child relation restoration command to the MFPs 10C and 10D. Alternatively, it is possible to notify at least one of the MFPs 10 whose identification information is registered, of the recovery and supply a parent-child relation restoration command to that MFP 10.

For example, the MFP 10A only needs to notify only the MFP 10C whose identification information as the parent is registered, of the recovery and supply the parent-child relation restoration command to the MFP 10C. Consequently, the MFP 10C cancels the temporary parent-child relation with the MFP 10D and restores the parent-child relation with the MFP 10A. On the other hand, the MFP 10D only needs to detect the MFP 10A and newly generate a parent-child relation with the MFP 10A after the temporary parent-child relation with the MFP 10C is canceled.

5. CONCLUSION

In a typical network in which there is a master apparatus (master, parent) that functions as a server, instructions may be output to respective apparatuses connected to the network via the master apparatus. In this case, when some kind of an anomaly occurs in the master apparatus, there is a fear that instructions may not be output appropriately to the apparatuses connected to the network. Moreover, since there is a need to register the apparatuses in the master apparatus in the first place, there is a fear that instructions cannot be output to apparatuses not registered in the master apparatus.

In contrast, according to this embodiment, all the MFPs are connected annularly to one another on an equal (no server and the like) footing so as to generate one family. With this structure, instructions for the MFPs do not need to be output via the master apparatus. In this case, the fear that instructions cannot be output appropriately to the MFPs when some kind of an anomaly occurs in the master apparatus is eliminated. In addition, since the MFPs do not need to be registered in the master apparatus, the fear that instructions cannot be output to MFPs not registered in the master apparatus is eliminated. Moreover, system settings and saving jobs of a specific MFP belonging to one family can be shared by all the MFPs in the family. In other words, each of the MFPs can be linked independently with other MFPs.

According to this embodiment, each of the MFPs that have generated the parent-child relations periodically makes an inquiry to the MFP as the child and periodically receives a response from the MFP as the child to periodically confirm that the parent-child relation is established. Upon detecting that the parent-child relation has been canceled since the MFP as the child is cut off from the network, the MFP detects an MFP that has been the parent of the MFP cut off from the network (parent-child relation is already canceled). Then, a temporary parent-child relation is generated between the MFPs that have respectively been the parent and child of the MFP cut off from the network. Accordingly, even when the MFP is excluded from the family due to the cutoff from the network, the annular family is maintained without disconnection.

According to this embodiment, as the MFP cut off from the network recovers, the MFP that has recovered causes the MFP that has been the parent and the MFP that has been the child to cancel the temporary parent-child relation and restore the parent-child relations to that before the cutoff. Accordingly, as the MFP that has been cut off from the network recovers, the MFP immediately recovers in the family, and thus the annular family is maintained.

According to this embodiment, the MFP scheduled to be shut down causes a temporary parent-child relation to be generated between the parent and child of that MFP. Accordingly, even when the MFP is excluded from the family due to the shutdown, the annular family is maintained without disconnection.

As the shutdown MFP recovers, the recovered MFP causes the MFP that has been the parent and the MFP that has been the child to cancel the temporary parent-child relation and restore the parent-child relations to that before the shutdown. Accordingly, as the shutdown MFP recovers, the MFP immediately recovers in the family, and thus the annular family is maintained.

It should be noted that the present disclosure is not limited to the image forming apparatus and is also applicable to other electronic apparatuses capable of connecting to a network.

It should be understood by those skilled in the art that various modifications, combinations, sub-combinations and alterations may occur depending on design requirements and other factors insofar as they are within the scope of the appended claims or the equivalents thereof.

The invention claimed is:

1. An electronic apparatus, comprising:
a memory that stores a program; and
a processor that executes the program,
wherein when the processor executes the program, the processor operates to
acquire a family generation command for generating one family including all electronic apparatuses connected to a network,
detect a plurality of electronic apparatuses connected to the network, and
generate, when receiving the family generation command, a correspondence relation with each of the two electronic apparatuses that have not generated a correspondence relation with other electronic apparatuses, out of the plurality of detected electronic apparatuses,
wherein when the processor executes the program, the processor further operates to
generate a correspondence relation with the apparatus itself being a parent and a first electronic apparatus being a child, the first electronic apparatus being the electronic apparatus that has been detected first, and
generate a correspondence relation with the apparatus itself being a child and a second electronic apparatus being a parent, the second electronic apparatus being the electronic apparatus that has been detected second.

2. The electronic apparatus according to claim 1,
wherein when the processor executes the program, the processor further operates to
cause the first electronic apparatus to generate a correspondence relation with the first electronic apparatus being a parent and any of the electronic apparatuses being a child, and
cause the second electronic apparatus to generate a correspondence relation with the second electronic apparatus being a child and any of the electronic apparatuses being a parent.

3. An electronic apparatus, comprising:
a memory that stores a program; and
a processor that executes the program,
wherein when the processor executes the program, the processor operates to
acquire a family generation command for generating one family including all electronic apparatuses connected to a network,
detect a plurality of electronic apparatuses connected to the network, and
generate, when receiving the family generation command, a correspondence relation with each of the two electronic apparatuses that have not generated a correspondence relation with other electronic apparatuses, out of the plurality of detected electronic apparatuses,
wherein when the processor executes the program, the processor further operates to
further acquire an addition command for newly adding an electronic apparatus to the already-generated family, and
when acquiring the addition command and newly detecting an electronic apparatus connected to the network,
cancel the correspondence relation with one of the two electronic apparatuses for which the correspondence relations have been generated,
newly generate a correspondence relation with the newly-detected electronic apparatus, and
cause a correspondence relation to be newly generated between the electronic apparatus for which the correspondence relation has been canceled and the newly-detected electronic apparatus.

4. The electronic apparatus according to claim 3,
wherein when the processor executes the program, the processor further operates to
when acquiring the addition command and newly detecting an electronic apparatus connected to the network,
cancel the correspondence relation with one of the two electronic apparatuses for which the correspondence relations have been generated,
newly generate a correspondence relation with the newly-detected electronic apparatus,
cause the newly-detected electronic apparatus to generate a correspondence relation with any of the electronic apparatuses, and
cause the electronic apparatus whose correspondence relation has been canceled to generate a correspondence relation with any of the electronic apparatuses.

5. An electronic apparatus, comprising:
a memory that stores a program; and
a processor that executes the program,
wherein when the processor executes the program, the processor operates to
acquire a family generation command for generating one family including all electronic apparatuses connected to a network,
detect a plurality of electronic apparatuses connected to the network, and
generate, when receiving the family generation command, a correspondence relation with each of the two electronic apparatuses that have not generated a correspondence relation with other electronic apparatuses, out of the plurality of detected electronic apparatuses,
wherein when the processor executes the program, the processor further operates to
further acquire a correspondence relation generation command for generating a correspondence relation with any of the electronic apparatuses,
inquire the number of generated correspondence relations by transmitting response requests to the plurality of electronic apparatuses connected to the network by broadcast or multicast,
acquire response information including the number of generated correspondence relations from each of the plurality of electronic apparatuses,
detect an electronic apparatus having the smallest number of generated correspondence relations based on the acquired response information, and generate a correspondence relation with the electronic apparatus having the smallest number of generated correspondence relations.

6. The electronic apparatus according to claim 5,
wherein when the processor executes the program, the processor further operates to
fail to generate a new correspondence relation when acquiring the correspondence relation generation command and correspondence relations are already generated with respect to two electronic apparatuses.

7. An electronic apparatus, comprising:
a memory that stores a program; and
a processor that executes the program,
wherein when the processor executes the program, the processor operates to
acquire a family generation command for generating one family including all electronic apparatuses connected to a network,
detect a plurality of electronic apparatuses connected to the network, and
generate, when receiving the family generation command, a correspondence relation with each of the two electronic apparatuses that have not generated a correspondence relation with other electronic apparatuses, out of the plurality of detected electronic apparatuses,
wherein the electronic apparatus is connectable to the network and is an electronic apparatus on the network in which each of the plurality of electronic apparatuses generates a correspondence relation with two other electronic apparatuses to be connected annularly,
wherein when the processor executes the program, the processor further operates to
detect that one of the two electronic apparatuses for which the correspondence relations have been generated has been cut off from the network,
detect an electronic apparatus that has generated a correspondence relation with the cutoff electronic apparatus out of the plurality of electronic apparatuses connected to the network, and
newly generate a correspondence relation with the electronic apparatus that has generated a correspondence relation with the cutoff electronic apparatus.

8. The electronic apparatus according to claim 7,
wherein when the processor executes the program, the processor further operates to
notify, when the electronic apparatus is recovered from the cutoff, the recovery to at least one of the two electronic apparatuses for which the correspondence relations have been generated before the cutoff and cause the notified electronic apparatus to cancel the newly-generated correspondence relation, and
generate the correspondence relation again with each of the two electronic apparatuses for which the correspondence relations have been generated before the cutoff.

9. An electronic apparatus, comprising:
a memory that stores a program; and
a processor that executes the program,
wherein when the processor executes the program, the processor operates to
acquire a family generation command for generating one family including all electronic apparatuses connected to a network,
detect a plurality of electronic apparatuses connected to the network, and
generate, when receiving the family generation command, a correspondence relation with each of the two electronic apparatuses that have not generated a correspondence relation with other electronic apparatuses, out of the plurality of detected electronic apparatuses,
wherein the electronic apparatus is connectable to the network and is an electronic apparatus on the network in which each of the plurality of electronic apparatuses generates a correspondence relation with two other electronic apparatuses to be connected annularly,
wherein when the processor executes the program, the processor further operates to command, when the apparatus itself is scheduled to be shut down, one of the two electronic apparatuses for which the correspondence relations have been generated to generate a correspondence relation with the other one of the electronic apparatuses, and command the other one of the electronic apparatuses to generate a correspondence relation with the other electronic apparatus, and
cancel, upon receiving the command, the correspondence relation with the electronic apparatus scheduled to be shut down and newly generates a correspondence relation with the commanded electronic apparatus.

10. The electronic apparatus according to claim 9,
wherein when the processor executes the program, the processor further operates to when the electronic apparatus is recovered from the shutdown,
notify the recovery to at least one of the two electronic apparatuses for which the correspondence relations have been generated before the shutdown and cause the notified electronic apparatus to cancel the newly-generated correspondence relation, and
generate the correspondence relation again with each of the two electronic apparatuses for which the correspondence relations have been generated before the shutdown.

11. A link system of electronic apparatuses, comprising
three or more electronic apparatuses connected to a network, each of the electronic apparatuses including
a memory that stores a program, and
a processor that executes the program,
wherein when the processor executes the program, the processor operates to
acquire a family generation command for generating one family including all electronic apparatuses connected to the network,
detect a plurality of electronic apparatuses connected to the network, and
generate, when receiving the family generation command, a correspondence relation with each of the two electronic apparatuses that have not generated a correspondence relation with other electronic apparatuses, out of the plurality of detected electronic apparatuses,
the three or more electronic apparatuses being connected annularly by each generating a correspondence relation with each of the two electronic apparatuses,
wherein when the processor executes the program, the processor further operates to
detect that one of the two electronic apparatuses for which the correspondence relations have been generated has been cut off from the network,
detect an electronic apparatus that has generated a correspondence relation with the cutoff electronic apparatus out of the plurality of electronic apparatuses connected to the network, and newly generate a correspondence relation with the electronic apparatus that has generated a correspondence relation with the cutoff electronic apparatus.

12. A link system of electronic apparatuses, comprising three or more electronic apparatuses connected to a network, each of the electronic apparatuses including a memory that stores a program, and a processor that executes the program, wherein when the processor executes the program, the processor operates to acquire a family generation command for generating one family including all electronic apparatuses connected to the network, detect a plurality of electronic apparatuses connected to the network, and generate, when receiving the family generation command, a correspondence relation with each of the two electronic apparatuses that have not generated a correspondence relation with other electronic apparatuses, out of the plurality of detected electronic apparatuses, the three or more electronic apparatuses being connected annularly by each generating a correspondence relation with each of the two electronic apparatuses, wherein when the processor executes the program, the processor further operates to command, when the apparatus itself is scheduled to be shut down, one of the two electronic apparatuses for which the correspondence relations have been generated to generate a correspondence relation with the other one of the electronic apparatuses, and command the other one of the electronic apparatuses to generate a correspondence relation with the other electronic apparatus, and cancel, upon receiving the command, the correspondence relation with the electronic apparatus scheduled to be shut down and newly generate a correspondence relation with the commanded electronic apparatus.

13. A method of linking three or more electronic apparatuses connected to a network, comprising:

by each of the electronic apparatuses, acquiring a family generation command for generating one family including all electronic apparatuses connected to the network;

detecting a plurality of electronic apparatuses connected to the network; and generating, upon receiving the family generation command, a correspondence relation with each of the two electronic apparatuses that have not generated a correspondence relation with other electronic apparatuses, out of the plurality of detected electronic apparatuses, the three or more electronic apparatuses being connected annularly by each generating a correspondence relation with each of the two electronic apparatuses, wherein the method further comprises:

by one of the electronic apparatuses, detecting that one of the two electronic apparatuses for which the correspondence relations have been generated has been cut off from the network;

detecting an electronic apparatus that has generated a correspondence relation with the cutoff electronic apparatus out of the plurality of electronic apparatuses connected to the network; and newly generating a correspondence relation with the electronic apparatus that has generated a correspondence relation with the cutoff electronic apparatus.

14. A method of linking three or more electronic apparatuses connected to a network, comprising:

by each of the electronic apparatuses, acquiring a family generation command for generating one family including all electronic apparatuses connected to the network;

detecting a plurality of electronic apparatuses connected to the network; and generating, upon receiving the family generation command, a correspondence relation with each of the two electronic apparatuses that have not generated a correspondence relation with other electronic apparatuses, out of the plurality of detected electronic apparatuses, the three or more electronic apparatuses being connected annularly by each generating a correspondence relation with each of the two electronic apparatuses, wherein the method further comprises:

commanding, by one of the electronic apparatuses, when the apparatus itself is scheduled to be shut down, one of the two electronic apparatuses for which the correspondence relations have been generated to generate a correspondence relation with the other one of the electronic apparatuses, and commanding the other one of the electronic apparatuses to generate a correspondence relation with the other electronic apparatus; and canceling, by the other one of the electronic apparatuses, upon receiving the command, the correspondence relation with the electronic apparatus scheduled to be shut down and newly generating a correspondence relation with the commanded electronic apparatus.

* * * * *